(12) United States Patent
Lofton (10) Patent No.: US 10,645,552 B2
(45) Date of Patent: May 5, 2020

(54) SYSTEM, METHOD AND APPARATUS FOR COMMUNICATION WITH OCCUPANTS OF A VEHICLE

(71) Applicant: Eddie B. Lofton, Snellville, GA (US)

(72) Inventor: Eddie B. Lofton, Snellville, GA (US)

( * ) Notice: Subject to any disclaimer, the term of this patent is extended or adjusted under 35 U.S.C. 154(b) by 0 days.

(21) Appl. No.: 16/291,173

(22) Filed: Mar. 4, 2019

(65) Prior Publication Data

US 2019/0222987 A1 Jul. 18, 2019

Related U.S. Application Data

(63) Continuation-in-part of application No. 15/380,602, filed on Dec. 15, 2016, now Pat. No. 10,264,610.

(60) Provisional application No. 62/368,117, filed on Jul. 28, 2016.

(51) Int. Cl.
*H04B 3/00* (2006.01)
*H04W 4/46* (2018.01)
*H04W 4/80* (2018.01)
*G08G 1/0967* (2006.01)
*G08G 1/0965* (2006.01)
*H04M 1/60* (2006.01)

(52) U.S. Cl.
CPC .......... *H04W 4/46* (2018.02); *G08G 1/0965* (2013.01); *G08G 1/096791* (2013.01); *H04M 1/6091* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 5,572,201 A * | 11/1996 | Graham | G08G 1/0965 340/902 |
| 6,052,603 A | 4/2000 | Kinzalow | |
| 6,252,519 B1 * | 6/2001 | McKenna | G08G 1/0965 340/464 |
| 6,609,055 B2 | 8/2003 | Stanley | |
| 6,804,525 B2 | 10/2004 | Davis | |
| 6,917,801 B2 | 7/2005 | Witte | |
| 7,020,486 B2 * | 3/2006 | Tanada | H04M 1/72513 455/552.1 |
| 7,133,767 B2 * | 11/2006 | Ogino | G01C 21/26 701/400 |
| 7,353,088 B2 | 4/2008 | Eagen et al. | |
| 7,376,137 B2 | 5/2008 | Sung et al. | |

(Continued)

*Primary Examiner* — Tuan A Tran
(74) *Attorney, Agent, or Firm* — Larson & Larson, P.A.; Frank Liebenow; Justin P. Miller (57) ABSTRACT

A method of communicating between a person within a target vehicle and a law enforcement person includes establishing a connection between a law-enforcement transceiver and a target vehicle transceiver using a protocol and encoding an audio signal into an encoded audio signal by the law-enforcement transceiver using the protocol, The encoded audio signal is transmitted from the law-enforcement transceiver and received by the target vehicle transceiver where the encoded audio signal is accepted by the target vehicle transceiver through a feature in the protocol, the feature in the protocol allowing limited access to an audio transducer of the target vehicle, the encoded audio signal is decoded back into the audio signal by the target vehicle transducer and the audio signal is reproduced on the audio transducer within the target vehicle.

19 Claims, 5 Drawing Sheets

(56) References Cited

U.S. PATENT DOCUMENTS

| | | | |
|---|---|---|---|
| 7,619,622 B2 | 11/2009 | Souza et al. | |
| 7,751,945 B2 * | 7/2010 | Obata | G08G 1/161 |
| | | | 340/902 |
| 8,200,158 B2 | 6/2012 | Lofton | |
| 8,401,477 B2 | 3/2013 | Lofton | |
| 8,532,575 B2 | 9/2013 | Lofton | |
| 8,682,004 B2 * | 3/2014 | Grigsby | G08G 1/0962 |
| | | | 340/435 |
| 8,872,563 B2 | 10/2014 | Lofton | |
| 8,939,839 B2 * | 1/2015 | Cash | H04L 67/38 |
| | | | 463/40 |
| 2002/0055343 A1 | 5/2002 | Stetzler et al. | |
| 2002/0140215 A1 | 10/2002 | Breed et al. | |
| 2003/0016636 A1 | 1/2003 | Tari et al. | |
| 2003/0136600 A1 | 7/2003 | Breed et al. | |
| 2004/0058649 A1 | 3/2004 | Grady | |
| 2006/0003737 A1 * | 1/2006 | Alrabady | H04L 63/0428 |
| | | | 455/410 |
| 2007/0112476 A1 | 5/2007 | Obradovich | |
| 2008/0140868 A1 | 6/2008 | Kalayjain et al. | |

\* cited by examiner

FIG. 5

SYSTEM, METHOD AND APPARATUS FOR COMMUNICATION WITH OCCUPANTS OF A VEHICLE

CROSS-REFERENCE TO RELATED APPLICATION

This application is a continuation-in-part of U.S. patent application Ser. No. 15/380,602, filed Dec. 15, 2016, which in turn is a non-provisional application claiming benefit of U.S. patent application Ser. No. 62/368,117, filed Jul. 28, 2016, the disclosure of which is hereby incorporated by reference.

FIELD OF THE INVENTION

This invention relates to the field of communications and more particularly to a system for communicating with an occupant of a vehicle.

BACKGROUND

There are many needs for communicating with an occupant of a vehicle, car, bus, truck, etc. Examples of such are to initiate a transaction at a drive through, answering questions at a roadblock or checkpoint, during a traffic stop, etc. Currently, to perform such communications requires that an occupant of the vehicle open a window or door and communicate through that open window or door.

An example of such communication occurs when one places an order at an order taking position of a fast food restaurant. In such, the occupant must roll down their window (or open their door) and verbally communicate with a speaker and microphone located at the order taking position. By opening the window, the occupant is exposed, not only to the weather, but to a potential of theft, bodily injury or carjacking. Meanwhile, the person taking the order is safe, dry and warm inside the fast food restaurant. To further compound the difficulty in communication, often the speaker is of inadequate quality to clearly hear the order taker and the background noise coupled with microphone quality and position makes it difficult for the order taker to hear and understand the occupant of the vehicle.

In certain climates, weather makes it uncomfortable and inconvenient for the occupant to open their window. In some location, cold weather includes temperatures well below zero, wind, rain, hail, snow, blowing snow, blowing sand and dust, etc. It is often uncomfortable to open a window in such climates, especially when young children are also situated in the vehicle. Many potential customers of establishments with drive-thru facilities are dissuaded from frequenting such establishments during bad weather.

In certain neighborhoods, it is dangerous to open a vehicle window for fear that a criminal will reach in the vehicle, cause bodily injury, grab something of value, coerce the occupant into getting out, etc. Many potential customers of establishments with drive-thru facilities are dissuaded from frequenting such establishments due to fear of lost valuables and/or bodily harm.

In certain law-enforcement situations it becomes necessary for a law officer, border guard, sentry, etc, to communicate with a vehicle occupant. For example, when a law officer makes a traffic stop, the officer must communicate with the driver to inform them of what they did wrong (speeding), get their name, license number, insurance company, etc. Similarly, at a checkpoint such as at a roadblock, border, etc, it is sometimes needed to ask questions of the vehicle occupants. The above noted or similar environmental, weather, and safety issues are present in these situations. In addition, there is a risk of bodily harm to the law enforcement officer. For example, when a law officer makes a traffic stop, it might be raining, snowing, etc. Often, the officer must get out of their vehicle to retrieve the driver's information, return to their vehicle to access their computer system and issue the summons, then exit their vehicle to present the summons to the driver. This exposes the officer to the elements and increases the risk of the officer being hit by a passing vehicle, especially in bad weather such as fog or when roads are slippery. Furthermore, the initial confrontation with the driver is a dangerous situation for the officer. If the individual is wanted for something serious, has a gun, or is otherwise dangerous, the initial confrontation often becomes a life threatening situation for the officer.

There are existing ways to perform such communications, none of which are practical. For example, a cellular phone can be used to establish a voice call with the occupant. This is not practical for several reasons: not everybody has a cell phone, cell phone calls often result in costs to the owner of the cell phone, and there is no established protocol for conveying an occupant's or driver's phone number to a law enforcement officer.

Another way to perform such communications is with a short-range wireless communication device such as a walkie-talkie. This solution would work if everybody had such a device and there were sufficient channels and security.

There are known one-way methods of communicating on-way to an occupant of vehicle. For years, it has been known to locally transmit audio to occupants of vehicles through the ubiquitous AM/FM radio present in almost every vehicle. This has been done to warn drivers of weather and traffic issues, to guide and inform drivers in theme parks, to describe attractions as the occupants drive through (e.g., animal parks), etc. This has long been used as an inward way to communicate in one direction, but this mechanism has no provision for the vehicle occupant(s) to communicate outwardly.

Many newer vehicles are equipped with an audio system that has local data communications such as Wi-Fi (IEEE 802.11) or Bluetooth (IEEE 802.15), for example for communicating with a device located within the vehicle to provide hands-free capabilities for phone calls through a cellular device. Such capabilities currently work within the vehicle, but do not communicate with devices outside of the vehicle, for example, with a law enforcement vehicle.

What is needed is a system that will enable two-way communication without requiring opening and/or approaching the vehicle.

SUMMARY

A two-way communication system for communicating with a person who is within a target vehicle is disclosed. Communication to the person is done by way of a short-range radio transmission with a transceiver (Bluetooth or Wi-Fi) within the vehicle. After paring or authentication, voice communication from the occupant(s) of the target vehicle are detected by a microphone in the target vehicle and transmitted out of the target vehicle on radio waves according to a protocol (e.g. Bluetooth or Wi-Fi). Voice communications from outside the target vehicle (e.g., from a law-enforcement vehicle) are received on radio waves according to such protocols (e.g. Bluetooth or Wi-Fi) and reproduced on one or more speakers within the target vehicle.

In one embodiment, a vehicle communication apparatus is disclosed including a first transceiver within a target vehicle. The first transceiver has a first audio transducer and a first microphone and is configured for communication with a second transceiver over a protocol. The second transceiver is associated with law enforcement and has at least a second microphone. The second transceiver communicates with the first transceiver of the target vehicle using the protocol and connects to the first transceiver to provide limited access. The limited access is to at least the first audio transducer. Audio from the second microphone is encoded over the protocol and transmitted from the second transceiver to the first transceiver whereas the first transceiver of the target vehicle receives the protocol, decodes the audio, and reproduces the audio on the first audio transducer.

In another embodiment, a method of communicating between a person within a target vehicle and a law enforcement person is disclosed. The method includes establishing a connection between a law-enforcement transceiver and a target vehicle transceiver using a protocol and encoding an audio signal into an encoded audio signal by the law-enforcement transceiver using the protocol, The encoded audio signal is transmitted from the law-enforcement transceiver and received by the target vehicle transceiver where the encoded audio signal is accepted by the target vehicle transceiver through a feature in the protocol, the feature in the protocol allowing limited access to an audio transducer of the target vehicle, the encoded audio signal is decoded back into the audio signal by the target vehicle transducer and the audio signal is reproduced on the audio transducer within the target vehicle.

In another embodiment, a communication apparatus is disclosed having a first transceiver within a target vehicle. The first transceiver is electrically and operatively interfaced to a first audio transducer and to a first microphone and is configured for communication with a second transceiver over a protocol. The second transceiver is associated with law enforcement (e.g. handheld by a law enforcement person or installed within a law enforcement vehicle). The second transceiver is electrically and operatively interfaced to a second audio transducer and to a second microphone and communicates with the first transceiver of the target vehicle using the protocol. The second transceiver connects to the first transceiver to provide limited access for exchange of encoded audio signals (e.g. connecting using a special encryption code or an approval from an occupant of the target vehicle). A first audio signal from the first audio transducer is encoded into a first encoded audio signal using the protocol and is transmitted from the first transceiver to the second transceiver. The first encoded audio signal is then decoded by the second transceiver back into the first audio signal and emitted on the second audio transducer. Likewise, a second audio signal from the second audio transducer is encoded into a second encoded audio signal using the protocol and is transmitted from the second transceiver to the first transceiver and then the second encoded audio signal is decoded by the first transceiver back into the second audio signal and emitted on the first audio transducer.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Note that throughout the description, existing local area communications protocols (Bluetooth and Wi-Fi) are used as examples of currently available technology, but it is fully anticipated that as standards evolve, such standards will be adapted for use with the described system.

Figure 1:
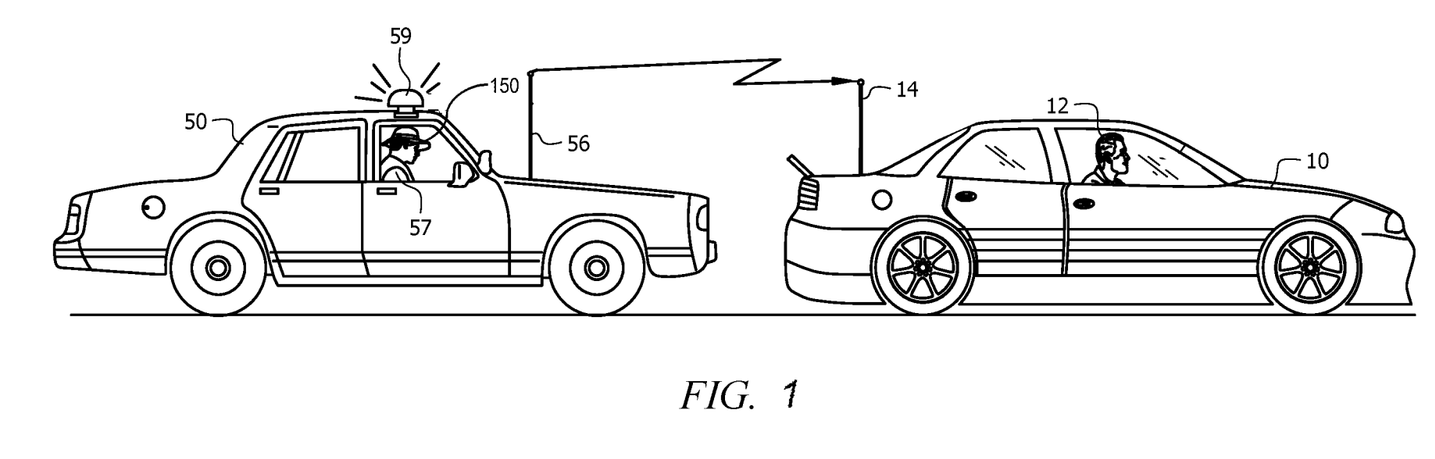
FIG. 1 illustrates a plan view illustrating a system for communicating between a law enforcement person and an occupant of a vehicle.

Referring to FIG. 1, a perspective view of a system for communicating with an occupant of a vehicle will be described. A high-quality, two-way audio communications system between a first entity such as vehicle (e.g. a car, boat, etc.—any target vehicle 10) and second entity such as a law-enforcement vehicle 50 (as shown), a military checkpoint, an entry station for a protected facility (e.g. guard station), etc. In the example shown in FIG. 1, a law-enforcement vehicle 50 is shown as an example of such. In this example, the target vehicle 10 is the subject of a traffic stop by an law enforcement personnel 57 within the law-enforcement vehicle 50. Prior to the present invention, the law enforcement personnel 57 had to exit their law-enforcement vehicle 50 and approach the suspect vehicle 10 in order to obtain information from the driver 12 (e.g., license, registration, and proof of insurance). Not only is this inconvenient in bad weather, but this has proven dangerous in many situations due to criminal activity within the target vehicle 10 as well as dangers from other motorists, especially on high-speed roads and during weather that impairs visibility and vehicle control such as snow and fog.

Although in some embodiments, the present invention provides communications between vehicles 10/50 that are not moving (e.g. registering zero on a speedometer), in other embodiments, the present invention provides communications between vehicles 10/50 that are moving, and in such, it is anticipated that there is a specific speed threshold, limit, or range of speeds at which communications are provided. For example, communications are allowed at speeds less than ten miles per hour or at speeds greater than 70 miles per hour (e.g., so speeders can be requested to slow down and pull over).

To provide the communications between the occupants of the target vehicle 10 with the occupant of the law-enforcement vehicle 50, the audio system of the target vehicle 10 is modified as will be describe so as to communicate with the communication system of the law-enforcement vehicle 50. With such, the law enforcement personnel 57 speaks into a microphone 80 (see FIGS. 3-5) and his or her voice is detected by the microphone 80 and the voice is encoded and transmitted by a law-enforcement transceiver 82 over a radio frequency signal according to a protocol such as Bluetooth or Wi-Fi (e.g., 802.11). The signal is transmitted between an antenna 56 associated with the law-enforcement vehicle 50 to an antenna 14 associated with the target vehicle 10. A transceiver 190 within the target vehicle 10 (see FIGS. 3-5) receives the signal and the transceiver 190 decodes the signal and reproduces the officer's voice on a transducer 24 (e.g. speaker, earbud) within the target vehicle 10. When the occupant(s), e.g. driver 12 of the target vehicle 10 speaks, their voices are detected by a microphone 22 within the target vehicle 10. The microphone 22 is coupled to the audio system 20 within the target vehicle 10 and the voice signal is processed by the transceiver 190 (e.g., Bluetooth or Wi-Fi radio) within the target vehicle 10. The transceiver 190 encodes the voice into the protocol and sends the encoded signal (e.g. modulated according to the protocol such as Bluetooth or Wi-Fi) to the law-enforcement transceiver 82 of the law-enforcement vehicle 50 where the modulated signal is decoded and reproduced as audio at an audio transducer 84 (e.g., speaker, earbud) within the law-enforcement vehicle 50. In some embodiments, the law enforcement personnel 57 wears a portable transceiver device 150 that is linked to the law-enforcement transceiver 82 providing hands-free communication while the law enforcement personnel 57 is within the law-enforcement vehicle 50 and/or after the law enforcement personnel 57 exits the law-enforcement vehicle 50 to approach the target vehicle 10. In this way, the law enforcement personnel 57 hears whatever is being said within the target vehicle 10 while approaching.

It is anticipated that some privacy issues may result in the use of such systems and such issues, if they occur, need to be dealt with through legislation or other means. For example, it is anticipated that a law be passed to permit an law enforcement personnel 57 to begin reception of audio from the occupant(s), e.g., driver 12 of the first vehicle 10 as soon as they turn on their emergency lights 59 and/or siren (not shown). Likewise, it is anticipated that any such communications between the law-enforcement vehicle 50 and the target vehicle 10 be private and protected from ease dropping by inadvertent listeners through data encryption standards of the selected communications protocols (e.g. Bluetooth or Wi-Fi).

It is also anticipated that, in some embodiments, the driver 12 of the target vehicle 10 needs to agree to the voice communications with the law enforcement personnel 57 by, for example, by accepting a pairing request (Bluetooth) or other features for accepting the incoming communications based upon the protocol used between the transceivers 82/190.

Figure 2:
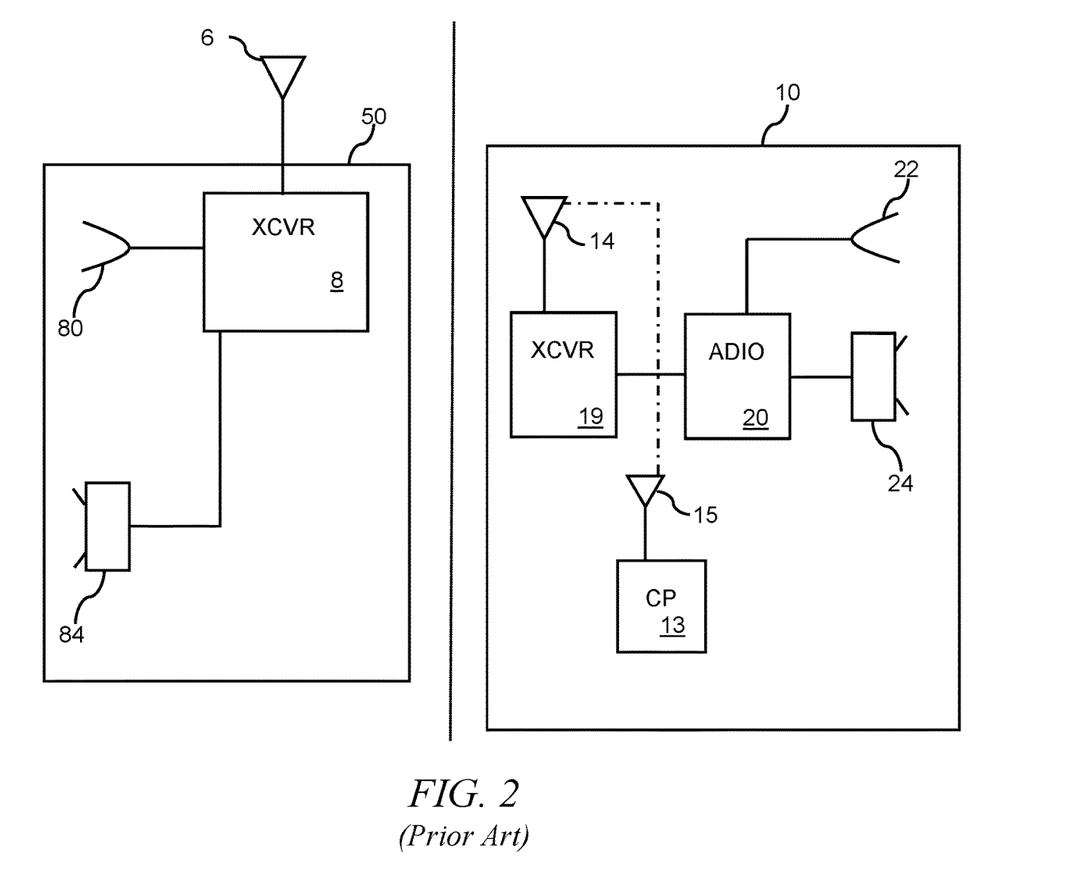
FIG. 2 illustrates a schematic view of the prior art.

Referring to FIG. 2, a schematic view of a system of the prior art will be described. In this example, the target vehicle 10 is equipped with an audio system 20 having a microphone 22 and transducer 24 (e.g., speaker, earbuds, headphone) within the target vehicle 10. This is a standard configuration on many newer model vehicles and is typically used to provide hands-free cellular calling (e.g., speakerphone mode) or to link to music players, etc.

To provide the hands-free operation, a transceiver 19 (e.g., Bluetooth and/or Wi-Fi) is integrated/coupled to the audio system 20. In existing vehicles, such transceivers 19 are typically used to communicate with consumer electronic devices 13 located within the target vehicle 10, in particular with cellular phones or media players within the target vehicle 10. In existing vehicles, such internal data communications are provided for playing music from the consumer electronic device 13, providing hands-free phone calls from the consumer electronic devices 13, etc. In existing protocols, before communications is established between the transceiver 19 and the consumer electronic device 13 (e.g., through antennae 14/15), the transceiver 19 and/or the consumer electronic device 13 must be configured to enable such communications. This enablement is required so that unauthorized devices cannot be easily connected to the transceiver 19 or the consumer electronic device 13. In the example of Bluetooth, the consumer electronic device 13 is paired with the transceiver 19, as known in the industry, typically by instructing both the transceiver 19 to accept and consumer electronic device 13 to initiate a discovery protocol. Once paired, the transceiver 19 typically remembers the consumer electronic device 13 for future communications. In the example of Wi-Fi, the transceiver 19 has encryption credentials and, matching encryption credentials must be entered into the consumer electronic device 13. Without such encryption credentials (or keys), communications is prohibited. This is similar to adding a consumer electronic device 13 to a home wireless network.

Within the law-enforcement vehicle 50 of the prior art, a microphone 80 and audio transducer 84 (e.g., speaker, earbuds, headphone) is typically connected to a transceiver 8. The transceiver is typically for wide-area communications with dispatchers, etc., modulating voice and data communications and sending/receiving such through an antenna 6. The transceiver 8 does not encodes the audio signal from the microphone 80 into a transmission protocol (e.g., Bluetooth or Wi-Fi), compatible with the existing transceiver 19 (coupled to the audio system 20) of the target vehicle 10 and, therefore, the existing transceiver does not communicate with the transceiver 8, having no way to pair and/or lack of proper encryption credentials and, therefore, the transceiver 19 of the target vehicle 10 does not communicate with the transceiver 8 of the law-enforcement vehicle 50.

Figure 3:
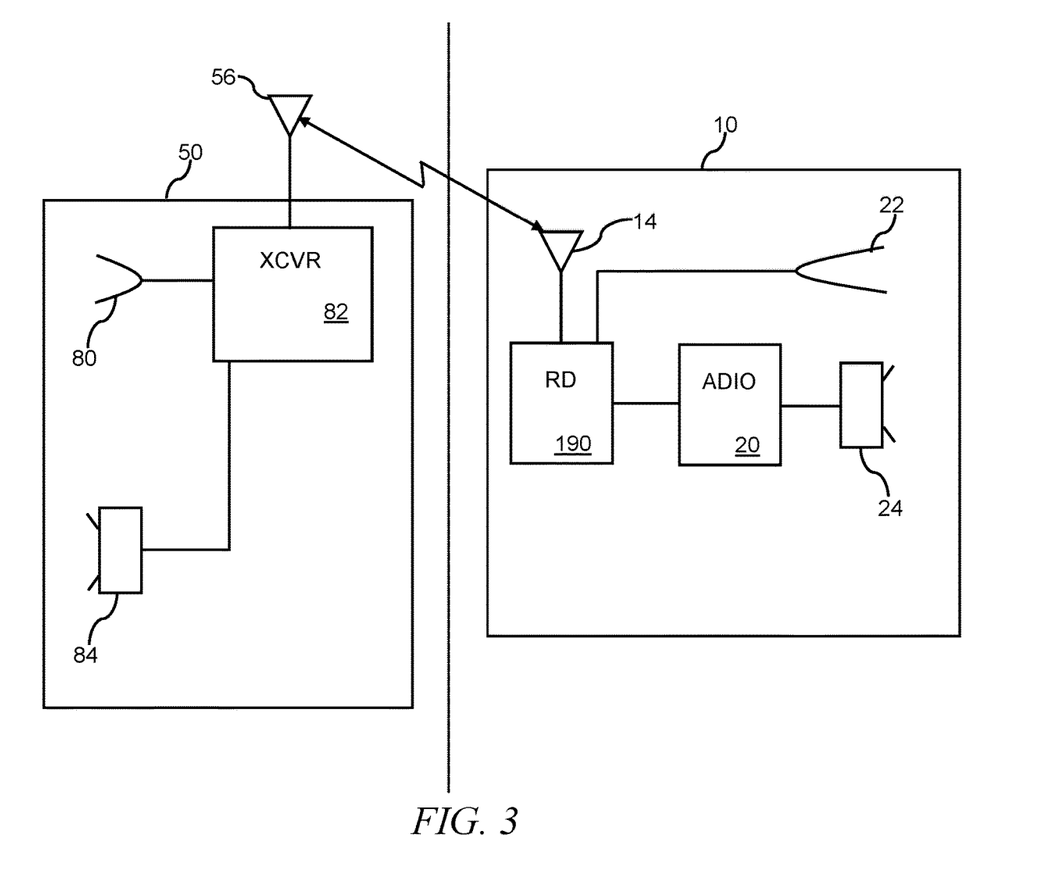
FIG. 3 illustrates a schematic view of a system for communicating with an occupant of a vehicle.

Referring to FIG. 3, a schematic view of a system for communicating with a driver 12 (or occupant) of a target vehicle 10 will be described. Within the law-enforcement vehicle 50 of this example, a microphone 80 and audio transducer 84 (e.g., speaker, earbuds, headphone) are connected to a law-enforcement transceiver 82. The law-enforcement transceiver 82 encodes the audio signal from the microphone 80 into the transmission protocol (e.g., Bluetooth or Wi-Fi) and emits the encoded signal from an antenna 56. For listening to the driver 12 of the target vehicle 10, the law-enforcement transceiver 82 receives and decodes audio signals according to the transmission protocol on the antenna 56 and reproduces the audio, for example, emitting the audio at an audio transducer 84 (e.g., speaker, earbuds, headphone).

It is anticipated that due to limitations of the transceiver 190 within the target vehicle 10 and certain protocol requirements and/or standards, the law-enforcement transceiver 82 will have higher transmission power output and/or greater receiver sensitivity since the transceiver 190 within the target vehicle 10 typically transmits/receives at very lower power levels, e.g. for communicating with devices within the target vehicle 10. In embodiments in which the protocol includes Bluetooth (802.15), the higher transmission power output is anticipated to be above the maximum power output allowance of a specification for Bluetooth (802.15) for penetration into the target vehicle.

In this embodiment, the audio system 20/190 of the target vehicle 10 is modified as will be describe so as to communicate with the law-enforcement transceiver 82 of the law-enforcement vehicle 50. When the law enforcement personnel 57 speaks into a microphone 80, his or her voice is detected by a microphone 80 and encoded/transmitted by the law-enforcement transceiver 82. The signal is transmitted between an antenna 56 associated with the law-enforcement vehicle 50 to an antenna 14 associated with the target vehicle 10 over a radio frequency signal according to a specific protocol such as Bluetooth or Wi-Fi (e.g., 802.11). The transceiver 190 within the target vehicle 10 understands the protocol transmitted by the law-enforcement transceiver 82, received, decodes, and reproduces the officer's voice on a transducer 24 (e.g., speaker, earbuds, headphone) within the target vehicle 10.

When the occupant(s), e.g. driver 12 of the target vehicle 10 speaks, their voice is detected by a microphone 22 within the target vehicle 10. The microphone 22 is coupled to the transceiver 190 (e.g., Bluetooth or Wi-Fi radio) within the target vehicle 10. The transceiver 190 encodes/modulates the voice signal from the occupant of the target vehicle 10 according to the protocol (e.g., Bluetooth or Wi-Fi) which is transmitted to the law-enforcement transceiver 82 of the law-enforcement vehicle 50 where the signal is decoded, demodulated, and reproduced as audio at an audio transducer 84 (e.g., speaker, earbuds, headphone) within the law-enforcement vehicle 50. In this way, the law enforcement personnel 57 hears whatever is being said within the target vehicle 10.

The transceiver 190 in the target vehicle 10 is similar to the existing transceiver 19 of the prior art with specific modifications to the protocols (e.g., Bluetooth and/or Wi-Fi) and/or pairing/encryption mechanisms to provide limited connections to an external device (e.g. law-enforcement transceiver 82) without the need to pair the transceiver 190 with the external device (e.g. law-enforcement transceiver 82) or to provide security credentials from the external device (e.g. law-enforcement transceiver 82). The limited capabilities provide for reproduction of an encoded audio signal received from an external device (e.g. law-enforcement transceiver 82) and/or transmission of voices to/from within the target vehicle 10 to an external device (e.g. law-enforcement transceiver 82). In some embodiments, a secret key is provided to/by the law-enforcement transceiver 82 that enables limited communications with the transceiver 190 within the target vehicle 10.

In some embodiments, the law-enforcement transceiver 82 requests pairing with the transceiver 190 within the target vehicle 10 and a message is displayed on the audio system 20 of the target vehicle (or an audio message is played and emitted from the transducer 24). The message requests that the driver 12 (or occupant, operator, etc.) of the target vehicle 10 agree to communicate with the law enforcement personnel 57. After approval by the driver 12 of the target vehicle 10, limited communications between the transceiver 190 within the target vehicle 10 and the law-enforcement transceiver 82 of the law-enforcement vehicle 50 is established. An example of such approval is for the driver 12 to press a button on the transceiver 190 or audio system 20 within the target vehicle 10 or press the volume-up button on the steering wheel of the target vehicle 10.

It is fully anticipated that, for some embodiments, these limited "back-door" capabilities are provided requiring specific law enforcement credentials, limiting access by non-law enforcement people. For example, the law-enforcement transceiver 82 has secret credentials that enable communication over the desired protocol (e.g. Bluetooth or Wi-Fi) to all transceivers 190 of all target vehicles 10. The secret credentials are provided by the law-enforcement transceiver 82 in the law-enforcement vehicle 50 to the transceiver 190 in the target vehicle 10. Once the secret credentials are discovered, for example by hackers, they are difficult to change. The consequence is that such hackers will only have the ability to access the audio capabilities of the target vehicle 10. It is anticipated that through legislation it be made illegal for non-law enforcement people to use such secret credentials, just as it is illegal to use certain police and military radio frequencies for civilian uses, etc.

In some embodiments, for various consumer rights reasons, it is fully anticipated that the transceiver 190 within the target vehicle 10 includes software that detects communications from the law-enforcement transceiver 82 and, before accepting a point-to-point connection with the law-enforcement transceiver 82, requires the driver 12 of the target vehicle 10 to take an action such as pressing an accept button, providing a voice approval by saying a word (e.g., "yes") to accept the point-to-point connection, etc.

Although the examples shown have a law-enforcement transceiver 82 within a law-enforcement vehicle 50, it is fully anticipated that the law-enforcement transceiver 82 (and hence, the microphone 80 and audio transducer 84), be embodied with other devices such as integrated into a hand-held portable device (e.g. worn on the body of the law enforcement personnel 57), within a guard house, in other types of vehicles such as helicopters, boats, motorcycles, etc. Likewise, the transceiver 190 of the target vehicle 10 is anticipated to be within any type of target vehicle 10, including, but not limited to marine vehicles, aircraft, golf carts, etc. Likewise, it is anticipated that the transceiver 190 of the target vehicle 10 is integrated with other electronics of the target vehicle 10.

Figure 4:
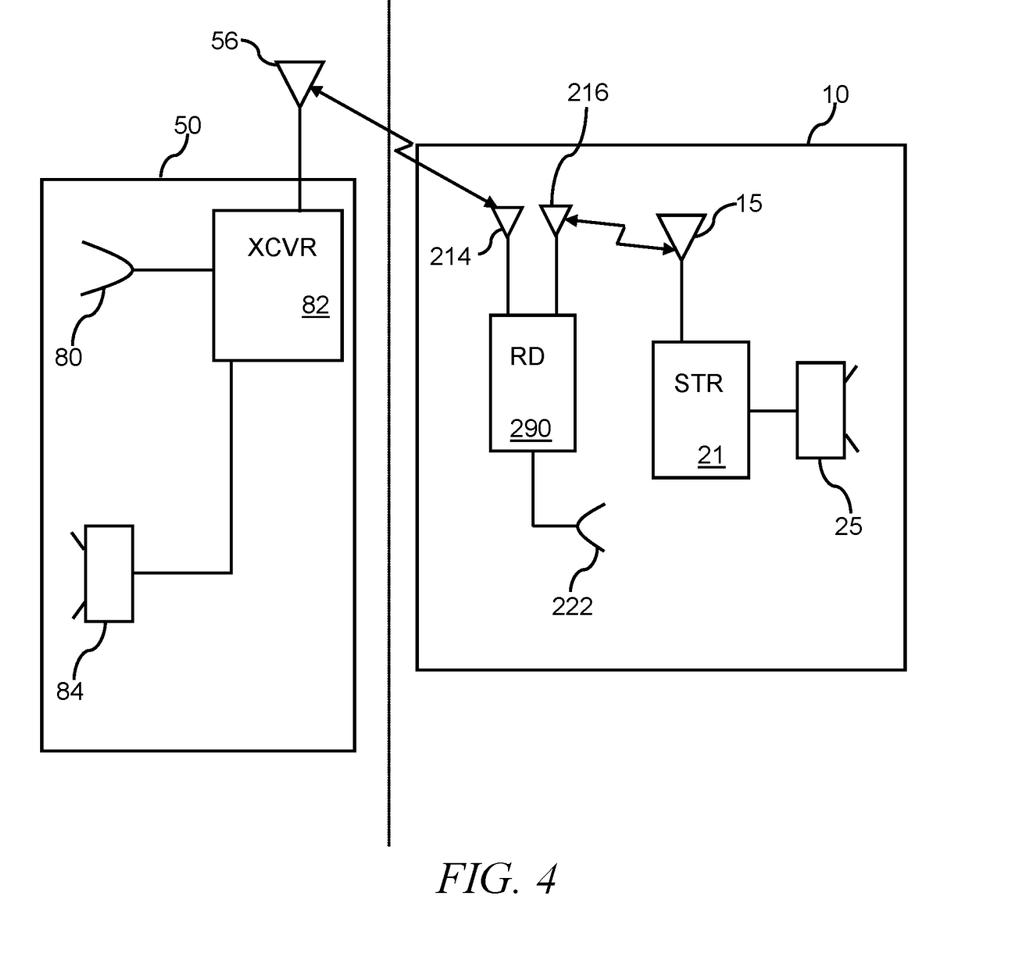
FIG. 4 illustrates a schematic view of the system for communicating with an occupant of a vehicle.

Referring to FIG. 4, a schematic view of the system for communicating with an driver 12 of a target vehicle 10 will be described. For many older-model vehicles, there are no wireless data communication facilities such as Bluetooth and Wi-Fi. For such vehicles, an adapter 290 is provided for installation within the target vehicle 10.

As in the prior example, the law-enforcement vehicle 50 of this example includes a microphone 80 and audio transducer 84 (e.g., speaker, earbuds, headphone) that are connected to a law-enforcement transceiver 82. The law-enforcement transceiver 82 encodes the audio signal from the microphone 80 into the transmission protocol (e.g., Bluetooth or Wi-Fi) and emits the encoded signal from an antenna 56. In this embodiment, the audio system 20/190 of the target vehicle 10 is modified as will be describe so as to communicate with the law-enforcement transceiver 82 of the law-enforcement vehicle 50. When the law enforcement personnel 57 speaks into a microphone 80, his or her voice is detected by a microphone 80 and encoded/transmitted from the law-enforcement transceiver 82 of the law-enforcement vehicle 50. The signal is transmitted between an antenna 56 associated with the law-enforcement vehicle 50 to an antenna 214 of the adapter 290 over a radio frequency signal according to a specific protocol such as Bluetooth or Wi-Fi (e.g., 802.11). The adapter 290 is a transceiver that understands the protocol transmitted by the law-enforcement transceiver 82, and, receives and decodes the officer's voice.

The adapter 290 receives the signal encoded with audio from the law-enforcement transceiver 82 of the law-enforcement vehicle 50 on a first antenna 214 and decodes the audio signal from the signal encoded with audio. The adapter 290 then modulates the decoded audio signal onto a radio-band using amplitude modulation or frequency modulation (e.g., AM or FM) and emits the modulated audio signal on a second antenna 216.

An existing radio 21 within the target vehicle 10 receives the modulated audio signal on an antenna 15, demodulates and amplifies the audio signal and emits the audio signal from a transducer 25 (e.g., speaker, earbuds, headphone). Note, it is anticipated that the existing radio 21 is any AM, FM, AM/FM radio either originally installed into the target vehicle 10, after-market installed in to the target vehicle 10, or is a hand-held portable AM, FM, or AM/FM radio, with or without additional features such as a CD player, etc.

When the occupant(s), e.g. driver 12 of the target vehicle 10 speaks, their voice is detected by a microphone 222 of the adapter 290. The microphone 222 is coupled to the adapter 290 (e.g., Bluetooth or Wi-Fi radio transceiver). The adapter 290 encodes/modulates the voice signal from the occupant of the target vehicle 10 according to the protocol (e.g., Bluetooth or Wi-Fi) and transmits the encoded signal to the law-enforcement transceiver 82 of the law-enforcement vehicle 50 where the signal is decoded, demodulated, and reproduced as audio at an audio transducer 84 (e.g., speaker, earbuds, headphone) within the law-enforcement vehicle 50. In this way, the law enforcement personnel 57 hears whatever is being said within the target vehicle 10.

The adapter 290 includes specific modifications, if needed, to the protocols (e.g., Bluetooth and/or Wi-Fi) and/or pairing/encryption mechanisms to provide limited connections to an external device (e.g. law-enforcement transceiver 82) without the need to explicitly pair the adapter 290 with the external device (e.g. law-enforcement transceiver 82) or to provide security credentials from the external device (e.g. law-enforcement transceiver 82). The limited capabilities provide for reproduction of an encoded audio signal received from an external device (e.g. law-enforcement transceiver 82) and/or transmission of voices to/from within the target vehicle 10 to an external device (e.g. law-enforcement transceiver 82). In some embodiments, a secret key is provided to the law-enforcement transceiver 82 that enables limited communications with the adapter 290.

In some embodiments, the law-enforcement transceiver 82 requests pairing with the adapter 290 and a message is displayed on a display of the adapter 290 or a text to speech message is played and emitted from the transducer 25 (e.g., speaker, earbuds, headphone). The message requests that the driver 12 of the target vehicle 10 agree to communicate with the law enforcement personnel 57. After approval by the driver 12 of the target vehicle 10, limited communications between the adapter 290 within the target vehicle 10 and the law-enforcement transceiver 82 of the law-enforcement vehicle 50 is established. An example of such approval is for the driver 12 to press a button on the adapter 290.

Figure 5:
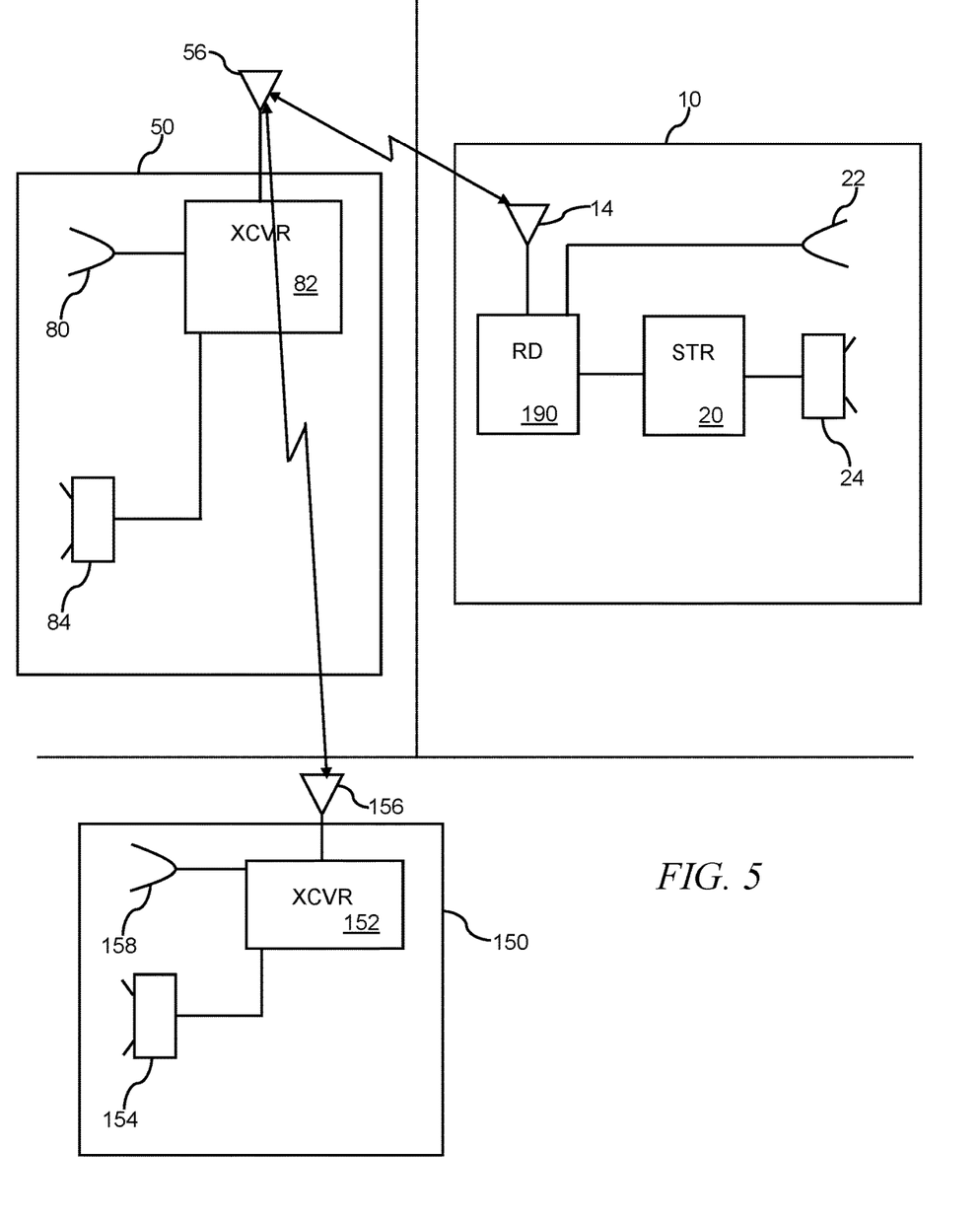
FIG. 5 illustrates a schematic view of the system for communicating with an occupant of a vehicle.

For certain uses, for example a traffic stop, it is beneficial for the law enforcement personnel 57 to remain in communications with the driver 12 of the target vehicle 10 after the officer exits the law-enforcement vehicle 50. To allow such communications, the law enforcement personnel 57 is provides with a portable transceiver device 150 as shown in FIG. 5 for use within or outside of the law-enforcement vehicle 50. Although it is anticipated that the portable transceiver device 150 be similar to an earbud (as shown in FIG. 1), there is no limitation as to the physical embodiment of the portable transceiver device 150, as other embodiments are anticipated including, but not limited to, a uniform-worn embodiment.

One exemplary embodiment of the portable transceiver device 150 is shown in FIG. 5. The portable transceiver device 150 has a transceiver 152 that receives an encoded audio signal on an antenna 156, detects, decodes and/or demodulates the encoded audio signal and reproduces the audio signal on a transducer 158 (e.g., an earbud, speaker, etc.). When the law enforcement personnel 57 speaks, the speech is received by a microphone 154 that is interfaced to the transceiver 152. The transceiver 152 encodes and modulates the audio signal from the microphone 154 and transmits an encoded audio signal from the antenna 156. This encoded audio signal is received on the antenna 56 of the law-enforcement vehicle 50, decoded by the law-enforcement transceiver 82 and then retransmitted or forwarded to the transceiver 190 of the target vehicle 10 where the encoded audio signal is decoded and reproduced on the transducer 24 (e.g., speaker, earbuds, headphone) as described above.

In an alternate embodiment, the law-enforcement transceiver 82 associated with the law-enforcement vehicle 50 along with audio transducer 84 (e.g. speaker, earbud) and microphone 80 are portable and handheld or worn by the law enforcement personnel 57, thereby eliminating the need for a separate portable transceiver device 150.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for law-enforcement communications comprising:
   a first transceiver within a target vehicle, the first transceiver comprising a first audio transducer and a first microphone, the first transceiver configured for communication with a second transceiver over a protocol; and
   the second transceiver associated with law enforcement has at least a second microphone and a second audio transducer, the second transceiver communicates with the first transceiver of the target vehicle using the protocol, the second transceiver establishes a point-to-point connection between the first transceiver and the second transceiver, thereby provides access to the first audio transducer such that audio from the first microphone is encoded over the protocol and transmitted from the first transceiver to the second transceiver and whereas the second transceiver receives the encoded audio, decodes the audio, and reproduces the audio on the second audio transducer;
   whereas before the second transceiver communicates with the first transceiver of the target vehicle using the protocol, a speed of the target vehicle is determined and when the speed is outside of a predetermined range, the first transceiver accepts and the second transceiver connects to the first transceiver receiving.

2. The apparatus of claim 1, wherein the protocol is Bluetooth (802.15).

3. The apparatus of claim 2, whereas a power output of the second transceiver exceeds a maximum power output allowance of a specification for Bluetooth (802.15) for penetration into the target vehicle.

4. The apparatus of claim 1, wherein the protocol is Wi-Fi (802.11).

5. The apparatus of claim 1, further comprising after the second transceiver establishes the point-to-point connection between the first transceiver and the second transceiver, audio from the first microphone is encoded over the protocol and transmitted from the first transceiver to the second transceiver whereas the second transceiver receives the protocol, decodes the audio from the first microphone, and reproduces the audio from the first microphone onto the second audio transducer of the second transceiver.

6. The apparatus of claim 1, further comprising a code that is known by the second transceiver and transmitted from the second transceiver to the first transceiver and the first transceiver accepts the point-to-point connection only after receiving the code.

7. The apparatus of claim 1, further comprising an approval required by the first transceiver before the second transceiver establishes the point-to-point connection between the first transceiver and the second transceiver.

8. The apparatus of claim 7, whereas approval includes operation of a control, the control interfaced with the first transceiver within the target vehicle.

9. The apparatus of claim 7, whereas approval includes reception of a voice approval by the first transceiver within the target vehicle.

10. A method of communicating between a person within a target vehicle and a law enforcement person, the method comprising:
    establishing a point-to-point connection between a law-enforcement transceiver and a target vehicle transceiver using a protocol;
    after establishing the point-to-point connection between the law-enforcement transceiver and the target vehicle transceiver encoding an audio signal into an encoded audio signal by the law-enforcement transceiver using the protocol;
    determining a speed of the target vehicle;
    when the speed of the target vehicle is zero, transmitting the encoded audio signal from the law-enforcement transceiver, and receiving the encoded audio signal by the target vehicle transceiver, and accepting the encoded audio signal by the target vehicle transceiver through a feature in the protocol, the feature in the protocol allowing access to an audio transducer of the target vehicle, the target vehicle transceiver decoding the encoded audio signal back into the audio signal, the target vehicle transceiver reproducing the audio signal on the audio transducer within the target vehicle.

11. The method of claim 10, wherein the step of establishing the point-to-point connection between the law-enforcement transceiver and the target vehicle transceiver requires a step of receiving credentials from the law-enforcement transceiver before accepting the point-to-point connection.

12. The method of claim 10, wherein the step of establishing the point-to-point connection between the law-enforcement transceiver and the target vehicle transceiver requires a step of the target vehicle indicating a desire for establishing of the point-to-point connection, and responsive to the indicating of the desire for establishing of the point-to-point connection, the target vehicle transceiver receiving a signal from a control indicative of an acceptance of the point-to-point connection.

13. The method of claim 10, wherein the step of establishing the point-to-point connection between the law-enforcement transceiver and the target vehicle transceiver requires a step of the target vehicle indicating a desire for establishing of the point-to-point connection, and responsive to the indicating of the desire for establishing of the point-to-point connection, the target vehicle transceiver receiving an audio command indicative of an acceptance of the point-to-point connection.

14. The method of claim 10, further comprising the steps of:
    encoding a second audio signal into a second encoded audio signal by the target vehicle transceiver using the protocol;
    transmitting the second encoded audio signal from the target vehicle transceiver; and
    receiving the second encoded audio signal by the law-enforcement transceiver, decoding the second encoded audio signal back into the second audio signal and delivering the second audio signal to a law-enforcement audio transducer.

15. An apparatus for law-enforcement communications comprising:
    a first transceiver within a target vehicle, the first transceiver electrically and operatively interfaced to a first audio transducer and to a first microphone, the first transceiver is configured for communication with a second transceiver over a protocol; and
    the second transceiver associated with law enforcement, the second transceiver electrically and operatively interfaced to a second audio transducer and to a second microphone; the second transceiver communicates with the first transceiver of the target vehicle using the protocol, the second transceiver connects to the first transceiver for exchange of encoded audio signals;
    whereas a first audio signal from the first audio transducer is encoded into a first encoded audio signal and the first encoded audio signal is transmitted from the first transceiver to the second transceiver using the protocol and the first encoded audio signal is received by the second transceiver and the first encoded audio signal is decoded by the second transceiver back into the first audio signal and emitted on the second audio transducer; and
    whereas a second audio signal from the second audio transducer is encoded into a second encoded audio signal and the second encoded audio signal is transmitted from the second transceiver to the first transceiver using the protocol and the second encoded audio signal is decoded by the first transceiver back into the second audio signal and emitted on the first audio transducer;
    whereas before the second transceiver connects to the first transceiver, a speed of the target vehicle is determined and when the speed is outside of a predetermined range, the first transceiver accepts and the second transceiver connects to the first transceiver receiving.

16. The apparatus of claim 15, whereas before the second transceiver connects to the first transceiver, the first transceiver requires the second transceiver transmit a code to the first transceiver.

17. The apparatus of claim 15, whereas before the second transceiver connects to the first transceiver, the first transceiver indicates a request to connect and, only after receiving a signal from a control that is electrically interfaced to the first transceiver, the first transceiver accepts and the second transceiver connects to the first transceiver.

18. The apparatus of claim 15, whereas before the second transceiver connects to the first transceiver, the first transceiver indicates a request to connect and, only after receiving a voice approval from the first microphone, the first transceiver accepts and the second transceiver connects to the first transceiver receiving.

19. The apparatus of claim 15, whereas the predetermined range is between 10 miles per hour and 70 miles per hour.

* * * * *